United States Patent [19]
Sarrasin

[11] Patent Number: 5,009,780
[45] Date of Patent: Apr. 23, 1991

[54] MULTI-WELL FILTRATION APPARATUS

[75] Inventor: Michael J. Sarrasin, Nashua, N.H.

[73] Assignee: Millipore Corporation, Bedford, Mass.

[21] Appl. No.: 383,127

[22] Filed: Jul. 20, 1989

[51] Int. Cl.$^5$ .............................................. B01D 69/00
[52] U.S. Cl. .................................... 210/238; 210/406; 210/450; 210/482
[58] Field of Search ............... 210/482, 450, 406, 238, 210/236, 767; 436/170; 435/291, 311; 422/61, 56

[56] References Cited

U.S. PATENT DOCUMENTS 3,803,810 4/1974 Rosenberg ...................... 210/446 X
4,317,726 3/1982 Shepel ............................. 210/482 X
4,477,575 10/1984 Vogel et al. ..................... 210/767 X Primary Examiner—Frank Spear
Attorney, Agent, or Firm—Andrew T. Karnakis; Paul J. Cook

[57] ABSTRACT

A filtration apparatus is provided comprising a multiwell plate wherein each of the wells in the plate has a filter membrane bonded to the entire peripheral surface of an opening of the well. The filter membrane has a tab which permits removing the filter membranes from the wells without rupturing the membrane.

5 Claims, 3 Drawing Sheets

MULTI-WELL FILTRATION APPARATUS

BACKGROUND OF THE INVENTION

This invention relates to a multi-well filtration device including a filtration membrane on each well which can be removed from the wells for analysis subsequent to filtration.

Test plates for in vitro analysis which contain a multiplicity of individual wells or reaction chambers are commonly known laboratory tools. Such devices have been employed for a wide variety of purposes and assays as exemplified by U.S. Pat. Nos. 3,694,464; 4,304,865; 4,276,048; 4,154,795; 4,427,415; 4,526,690 and Re 30,562. Microporous membrane filters and filtration devices containing such microporous membranes have been especially useful with many of the recently developed cell and tissue culture techniques and assays, particularly those in the field of virology and immunology, wherein the material of interest is retained by the filter. Typically, a ninety-six well filtration plate is used to conduct multiple assays simultaneously, some steps which may last several hours prior to performing filtration. Often the material of interest is retained on the filter. However, if an analytical instrument of interest cannot read the filters directly in the plate wells, the filters must be removed from the wells.

It has also been proposed to utilize a die-punch having a flat face which is inserted into the well and through the filter paper bearing the retentate in order to direct the filter paper and retentate from the well into a vial for subsequent testing. This system has two major problems. First, many times only a portion of the filter paper circumference is sheared and the filter disc remains attached to the well. Secondly, the flat face of the punch tends to remove some of the retentate from the filter paper so that the subsequent testing is inaccurate. An alternative system utilizes a hollow tube as a punch to minimize the contact face of the punch and reduce the amount of sample accidentally transferred to the punch. In another system, the filter is scored about its circumference in order to facilitate subsequent punching. This system is undesirable since accidental rupturing of the filter paper along the scoring can occur. Also, all of these systems are undesirable since they each involve the physical transfer of individual filter discs.

For a counter which requires a flat sample array, it would be preferable to transfer the filter discs directly from the well ends to a film coated with adhesive to maintain the relative locations of all the filter discs. This system is satisfactory with some membrane filters but not with multi layer filter laminates which have a tendency to delaminate thereby effecting transfer of only a portion of the bottom filter layer to the adhesive and leaving the support web and all the upper filter surface and sample still attached to the well. Accordingly, it would be desirable to provide a means for removing retentate and filter paper from a multi-well filtration plate which assures that the filter paper will be completely removed from the well without loss of a portion of the retentate for purposes of subsequent testing. Furthermore, it would be desirable to provide such means which permits removal of the filter and retentate from a plurality of wells simultaneously onto a flat surface so that use of analytical apparatus requiring a flat surface for supporting samples is facilitated.

SUMMARY OF THE INVENTION

This invention provides a multi-well filtration apparatus suitable for the assay of microliter quantity of biological and biochemical materials. The filtration apparatus includes a plate having a plurality of wells, open at one end and having a filtration membrane positioned across an opposing end. The filtration membrane can be formed as one layer or as a laminate and is shaped so that it can be easily removed from the bottom of the well after the exposed lower surface has been contacted with an adhesive sheet. The filtration membrane is shaped so that it can be heat sealed to the entire periphery, e.g., circumference of the well and has a tab section which extends outside of the seal periphery. The tab sections on each well extend in substantially the same direction so that after filtration, when an adhesive sheet is applied to the exposed lower surfaces of the filtration membranes to adhere them to the sheet, the membranes can be easily and completely torn away from the wells by pulling the sheet in a direction substantially opposite to the direction toward which the tab sections extend.

DETAILED DESCRIPTION OF SPECIFIC EMBODIMENTS

This invention provides an improved multi-well filtration apparatus including a plurality of membrane filters which permits the recovery of retentate on the membrane filters produced during filtration. Each membrane filter is formed of a shape so that it can be heat sealed at the bottom of the well and includes a tab section extending outside the periphery of the seal. The tab section on each membrane filter extends generally in the same direction so that when an adhesive sheet is applied to the exposed bottom surface of the membrane filters, the filters can be completely removed from the wells by applying a pulling force to the adhesive sheet in a direction generally opposite to the direction in which the tabs extend when sealed to the wells. In this manner, since nothing touches the filter surface which bears the retentate, loss of retentate is prevented and the retentates can be analyzed when positioned on a flat sheet.

Figure 1:
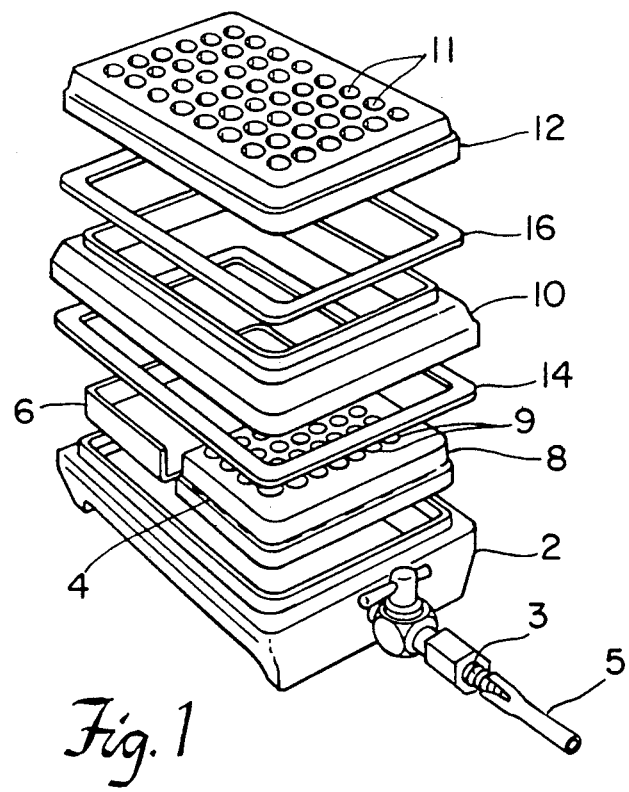
FIG. 1 is an expanded view of a vacuum assembly useful with the present invention.
Figure 2:
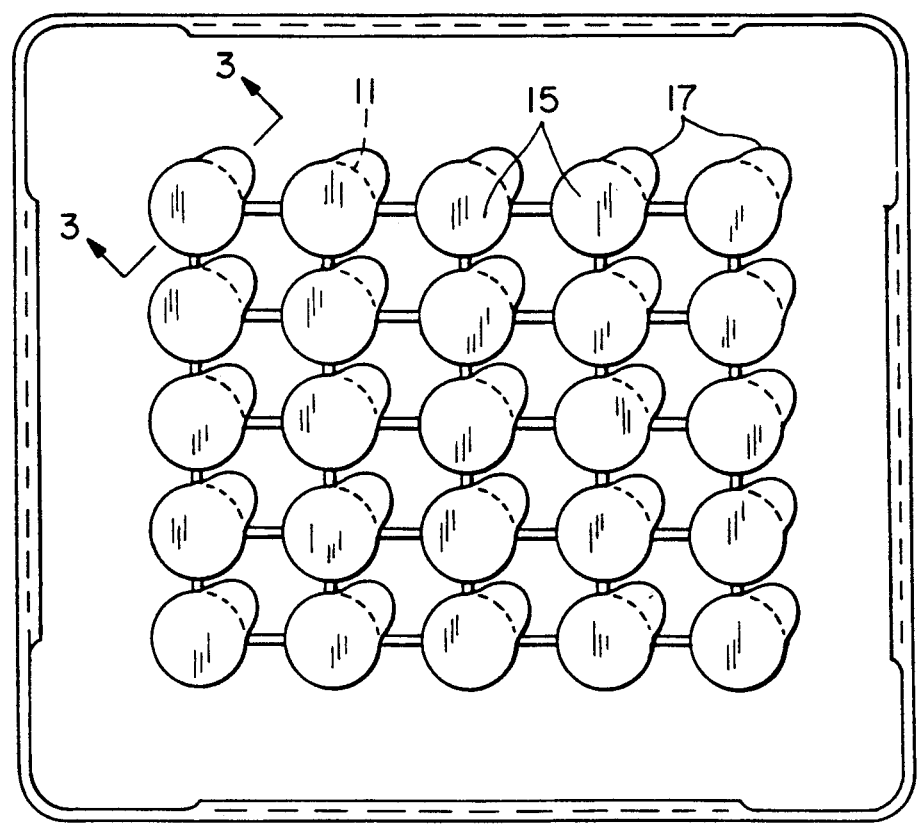
FIG. 2 is a top view of a filtration apparatus comprising a second plate portion of this apparatus.

Referring to FIG. 1, a vacuum assembly is shown capable of simultaneously processing a plurality of test samples of a size usually up to about 400 microliters each. The vacuum assembly comprises a base 2 which acts as a vacuum chamber and contains a hose barb 3 for connection to a regulated external vacuum source through hose 5. Positioned within the base 2 are liquid collection means 4 which includes a collection tray 6 and/or a receiving plate 8 having a plurality of individual chambers 9 for collecting filtrate. The individual chambers 9 are associated each with a single well 11 in filtration plate 12. A plate support 10 holding the filtration plate 12 above the fluid collection means 4 is separated by gaskets 14 and 16 which form an airtight seal in the presence of a vacuum force exerted through hose 5.

Figure 3A:
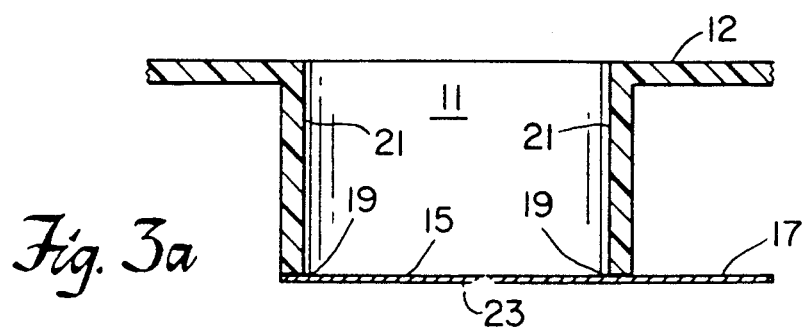
FIG. 3a is a cross sectional view of the apparatus of this invention, shown positioned above a receptacle.
Figure 3B:
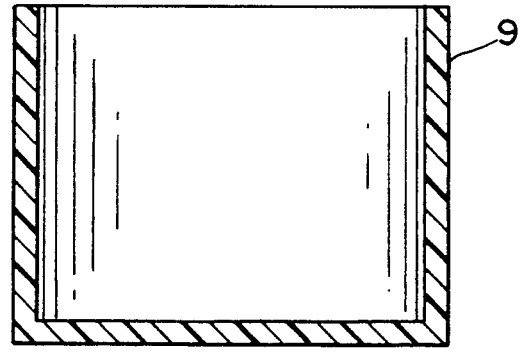
FIG. 3b is a cross-sectional view of a receptacle used in conjunction with the apparatus of this invention.

Referring to FIGS., 3a and 3b, plate 12 includes a plurality of wells 11 to which are heat sealed filter membranes 15 including tab sections 17 which extend generally in the same direction. The filter membranes 15 are heat sealed on the lower surface 19 of well wall 21. Well 11 extends downwardly to the point such that membrane 15 is positioned above receptacle 9 such that the liquid passing through membrane 15 is directed into receptacle 9. Any conventional bonding method can be utilized to bond membrane 15 to plate 12. As shown, for example in FIGS. 3a and 3b, the tab 17 can extend a distance outside the well 9 from the surface 19. However, it is to be understood that the tab can extend a distance which can be inside the well or to the well wall. In addition, the tab can extend from the entire periphery of the seal if desired. It is desirable to avoid a tab which is too narrow or which has an abrupt angle with the main disc in order to avoid tearing across the center portion of the disc rather than peeling. Representative suitable micro-porous membrane include nitrocellulose, cellulose acetate, polycarbonate, polypropylene and polyvinylidene fluoride microporous membranes. Alternatively, the membrane can comprise an ultrafiltration membrane, which membranes are useful for retaining molecules as small as about 100 daltons and generally molecules as large as about 2,000,000 daltons. Examples of such ultrafiltration membranes include polysulfone, polyvinylidene fluoride or cellulose or the like. Also, the membrane can be comprised of depth filter media such as paper or glass fibers. In addition, the filter membrane can be formed as a laminate structure comprising a microporous membrane bonded to a woven or non-woven substrate. The tab section of the membrane extends a distance between about 0.5 and about 5 mm, preferably about 0.2 mm from the line of sealing. When the major dimension or length of the tab section is too small, the membrane will have a high tendency to tear when removal from the wells 11 is attempted.

The membranes with the tab section can be formed by any conventional means such as by the steps of heat sealing a membrane sheet to the bottom surfaces of the wells 11 and then cutting the membrane sheet into the desired shapes such as by laser. Filtration then can be effected.

Figure 4:
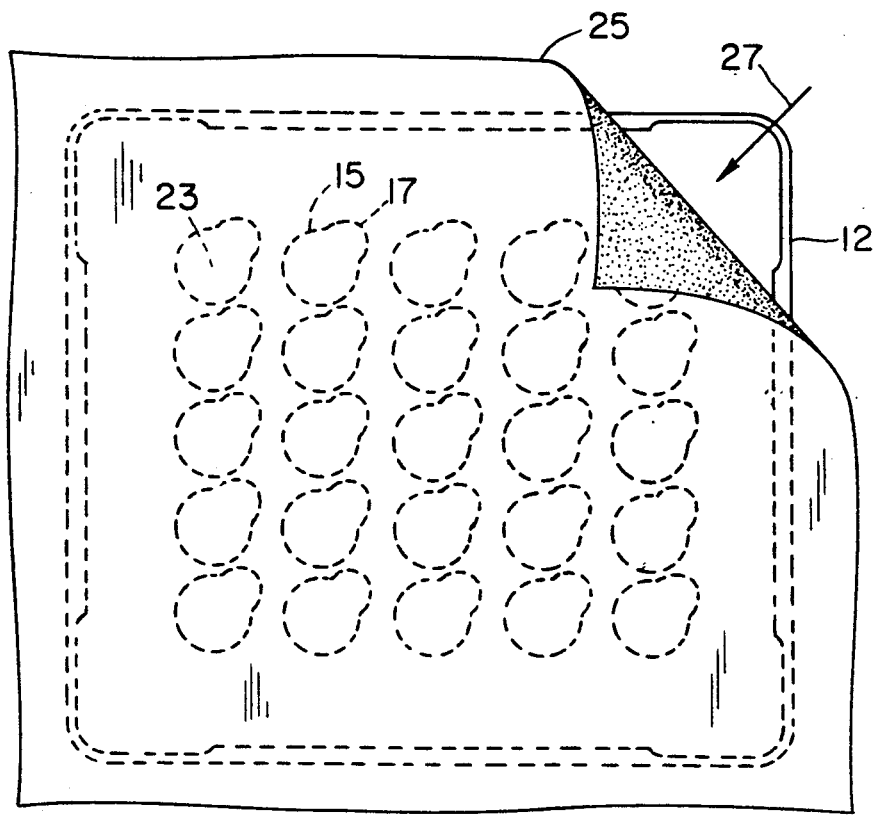
FIG. 4 is a top view showing a means for removing filter membranes after filtration.
Figure 5:
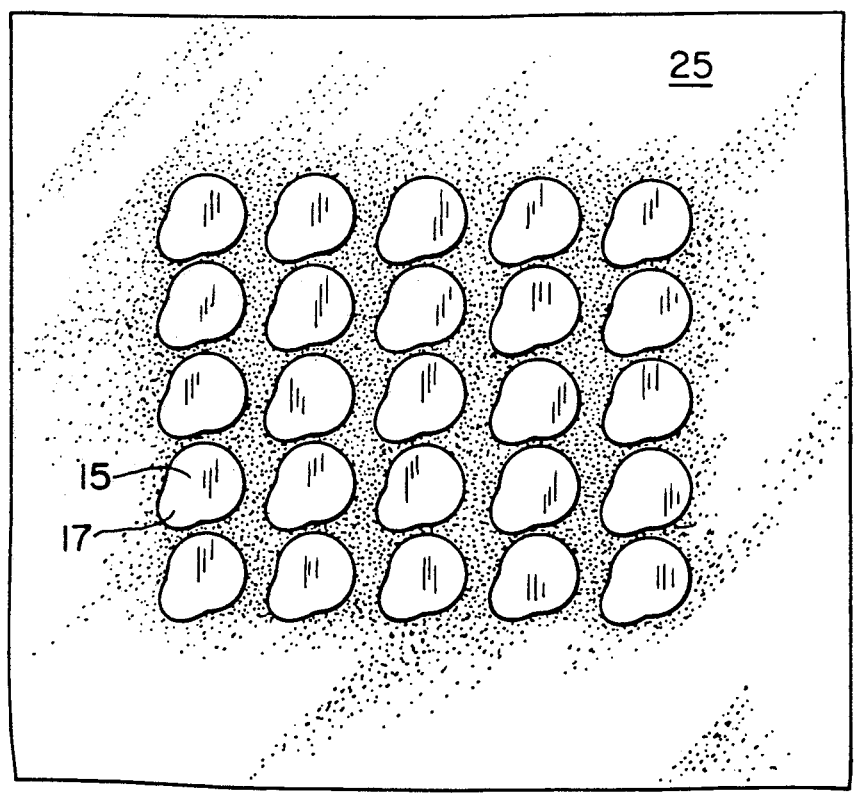
FIG. 5 is a top view showing removed filter membranes positioned on an adhesive sheet.

Referring to FIG. 4, after filtration has been completed so that retentate is positioned on the membrane surfaces within wells 11, an adhesive sheet 25 is applied to the rententate-free bottom surface 23 of the membrane 15 so that both the filtrate sections and the tab section 17 of the membrane 15 are adhered to the sheet 25. The sheet 25 then is pulled in the direction of arrow 27 which is the direction about 180° from the direction in which the tab sections 17 extend. As shown in FIG. 5, the membranes 15 including tab section 17 are adhered to the flat sheet 25 and the individual retentates thereon are exposed for analysis.

What is claimed is:

1. A filtration apparatus comprising:
   a plate having at least one well, having a first open end for introducing liquid into said well, a second end and an outside peripheral surface about said second end,
   a filter membrane having a center section and a tab section, said center section being bonded to said peripheral surface, said tab section being formed with said center section and extending away from said peripheral surface, said tab section and said center section forming an exposed planar surface, and said tab section having a size and shape which permits removing said membrane from said peripheral surface while avoiding rupture of said membrane.

2. The apparatus of claim 1 wherein said filter membrane is a microporous membrane.

3. The apparatus of claim 1 wherein said filter membrane is an ultrafiltration membrane.

4. The apparatus of claim 1 wherein said filter membrane is a depth filter.

5. The apparatus of claim 1 wherein said filter membrane is a laminate.

* * * * *